US 12,466,386 B2

(12) United States Patent
Masuda et al.

(10) Patent No.: US 12,466,386 B2
(45) Date of Patent: Nov. 11, 2025

(54) VEHICLE CONTROL DEVICE (71) Applicant: HONDA MOTOR CO., LTD., Tokyo (JP)

(72) Inventors: Rui Masuda, Tokyo (JP); Yosuke Naito, Tokyo (JP); Mamiko Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 333 days.

(21) Appl. No.: 17/585,049

(22) Filed: Jan. 26, 2022

(65) Prior Publication Data
US 2022/0258719 A1 Aug. 18, 2022

(30) Foreign Application Priority Data

Feb. 15, 2021 (JP) .................................. 2021-022125

(51) Int. Cl.
*B60W 20/15* (2016.01)
*B60W 10/08* (2006.01)
(Continued)

(52) U.S. Cl.
CPC ............ *B60W 20/15* (2016.01); *B60W 10/08* (2013.01); *B60W 10/26* (2013.01); *B60W 20/13* (2016.01);
(Continued)

(58) Field of Classification Search
CPC ...... B60W 20/00; B60W 20/10; B60W 20/13; B60W 20/14; B60W 20/15; B60W 10/00;
(Continued)

(56) References Cited

U.S. PATENT DOCUMENTS 6,290,012 B1 9/2001 Matsubara et al.
2002/0069000 A1 6/2002 Nakao
(Continued)

FOREIGN PATENT DOCUMENTS

CN 101663804 A 3/2010
JP 2001-045608 A 2/2001
(Continued)

OTHER PUBLICATIONS

Sep. 13, 2022, Japanese Office Action issued for related JP Application No. 2021-022125.
(Continued)

Primary Examiner — Khoi H Tran
Assistant Examiner — Sarah A Tran
(74) Attorney, Agent, or Firm — Paratus Law Group, PLLC (57) ABSTRACT A vehicle control device is configured to: execute motor assist when a vehicle is traveling by a drive wheel being driven by an internal combustion engine, in which electric power of a power storage device is supplied to an electric motor and the electric motor assists driving of the drive wheel; change upper-limit assist electric power, which is an upper-limit value of electric power supplied from the power storage device to the electric motor in order to perform the motor assist, in accordance with a temperature of the power storage device; and when the temperature of the power storage device reaches a first temperature, restrict the upper-limit assist electric power such that a reduction amount of a maximum driving force of the vehicle falls within an allowable range.

3 Claims, 4 Drawing Sheets (51) Int. Cl.
*B60W 10/26* (2006.01)
*B60W 20/13* (2016.01)

(52) U.S. Cl.
CPC ... *B60W 2510/246* (2013.01); *B60W 2520/10* (2013.01); *B60W 2710/086* (2013.01)

(58) Field of Classification Search
CPC ...... B60W 10/02; B60W 10/04; B60W 10/06; B60W 10/08; B60W 10/24; B60W 10/26; B60W 2510/00; B60W 2510/24; B60W 2510/242; B60W 2510/246; B60W 2520/00; B60W 2520/10; B60W 2520/105; B60W 2710/00; B60W 2710/08; B60W 2710/086; B60W 2710/087; Y02T 10/00; Y02T 10/60; Y02T 10/62; Y02T 10/72; B60K 6/00; B60K 6/20; B60K 6/22; B60K 6/38; B60K 6/42; B60K 6/44; B60K 6/442; B60K 6/387
USPC .......................................................... 701/22
See application file for complete search history.

(56) References Cited

U.S. PATENT DOCUMENTS

| | | |
|---|---|---|
| 2008/0249745 A1 | 10/2008 | Heap et al. |
| 2010/0114413 A1 | 5/2010 | Ichikawa et al. |
| 2019/0161075 A1 | 5/2019 | Sato |
| 2020/0106114 A1* | 4/2020 | Moriya ............... H01M 10/625 |

FOREIGN PATENT DOCUMENTS

| | | | |
|---|---|---|---|
| JP | 2002-171603 A | | 6/2002 |
| JP | 2015-033154 A | | 2/2015 |
| JP | 2017100471 A | * | 6/2017 |
| JP | 2019-094013 A | | 6/2019 |
| JP | 2020184857 A | * | 11/2020 |

OTHER PUBLICATIONS

Apr. 23, 2025, Translation of Chinese Office Action issued for related CN Application No. 202210131358.2.

* cited by examiner

| TRAVELING MODE | FIRST CLUTCH | SECOND CLUTCH | ENGINE | MOTOR | GENERATOR |
|---|---|---|---|---|---|
| EV TRAVELING MODE | DISENGAGE | DISENGAGE | STOP POWER OUTPUT | HYBRID DRIVE | STOP POWER GENERATION |
| HYBRID TRAVELING MODE | DISENGAGE | DISENGAGE | OUTPUT POWER | GENERATOR DRIVE | GENERATE POWER |
| LOW-SPEED SIDE ENGINE TRAVELING MODE | ENGAGE | DISENGAGE | OUTPUT POWER | OUTPUT POWER AS NECESSARY | STOP POWER GENERATION |
| HIGH-SPEED SIDE ENGINE TRAVELING MODE | DISENGAGE | ENGAGE | OUTPUT POWER | OUTPUT POWER AS NECESSARY | STOP POWER GENERATION |

VEHICLE CONTROL DEVICE

CROSS-REFERENCE TO RELATED APPLICATIONS

This application is based on and claims priority under 35 USC 119 from Japanese Patent Application No. 2021-022125 filed on Feb. 15, 2021, the contents of which are incorporated herein by reference.

TECHNICAL FIELD

The present invention relates to a vehicle control device.

BACKGROUND

In recent years, a hybrid electric vehicle that includes an internal combustion engine and an electric motor serving as a driving source for driving drive wheels has been known. In some hybrid electric vehicles of this type, electric power of a power storage device is appropriately supplied to the electric motor to assist driving of the drive wheels by the electric motor.

In addition, the JP-A-2019-094013 discloses a technique in which maximum allowable power at the time of charging/discharging of a battery (that is, an input/output limit of a battery) can be changed in accordance with a temperature of the battery.

However, when the electric power supplied from the power storage device to the electric motor is reduced while a driving force of the electric motor is used for driving the drive wheels, the driving force for driving the drive wheels (that is, the driving force for driving the vehicle) suddenly drops, which may give the driver a feeling of strangeness and reduce drivability.

The present invention provides a vehicle control device capable of suppressing degradation of a power storage device while avoiding a decrease in drivability.

SUMMARY

The present invention provides a vehicle control device that controls a vehicle, the vehicle including an internal combustion engine, a power storage device, an electric motor that performs driving based on supply of electric power from at least the power storage device, and a drive wheel that is driven by at least one of the internal combustion engine and the electric motor, in which the vehicle control device is configured to:

execute motor assist when the vehicle is traveling by the drive wheel being driven by the internal combustion engine, in which electric power of the power storage device is supplied to the electric motor and the electric motor assists driving of the drive wheel;

change upper-limit assist electric power, which is an upper-limit value of electric power supplied from the power storage device to the electric motor in order to perform the motor assist, in accordance with a temperature of the power storage device; and when the temperature of the power storage device reaches a first temperature, restrict the upper-limit assist electric power such that a reduction amount of a maximum driving force of the vehicle falls within an allowable range.

According to the present invention, it is possible to provide a vehicle control device capable of suppressing degradation of a power storage device while avoiding a decrease in drivability.

BRIEF DESCRIPTION OF DRAWINGS

Exemplary embodiments of the present invention will be described in detail based on the following figures, wherein.

DESCRIPTION OF EMBODIMENTS

Hereinafter, an embodiment of a vehicle control device according to the present invention will be described in detail with reference to the drawings.

Figure 1:
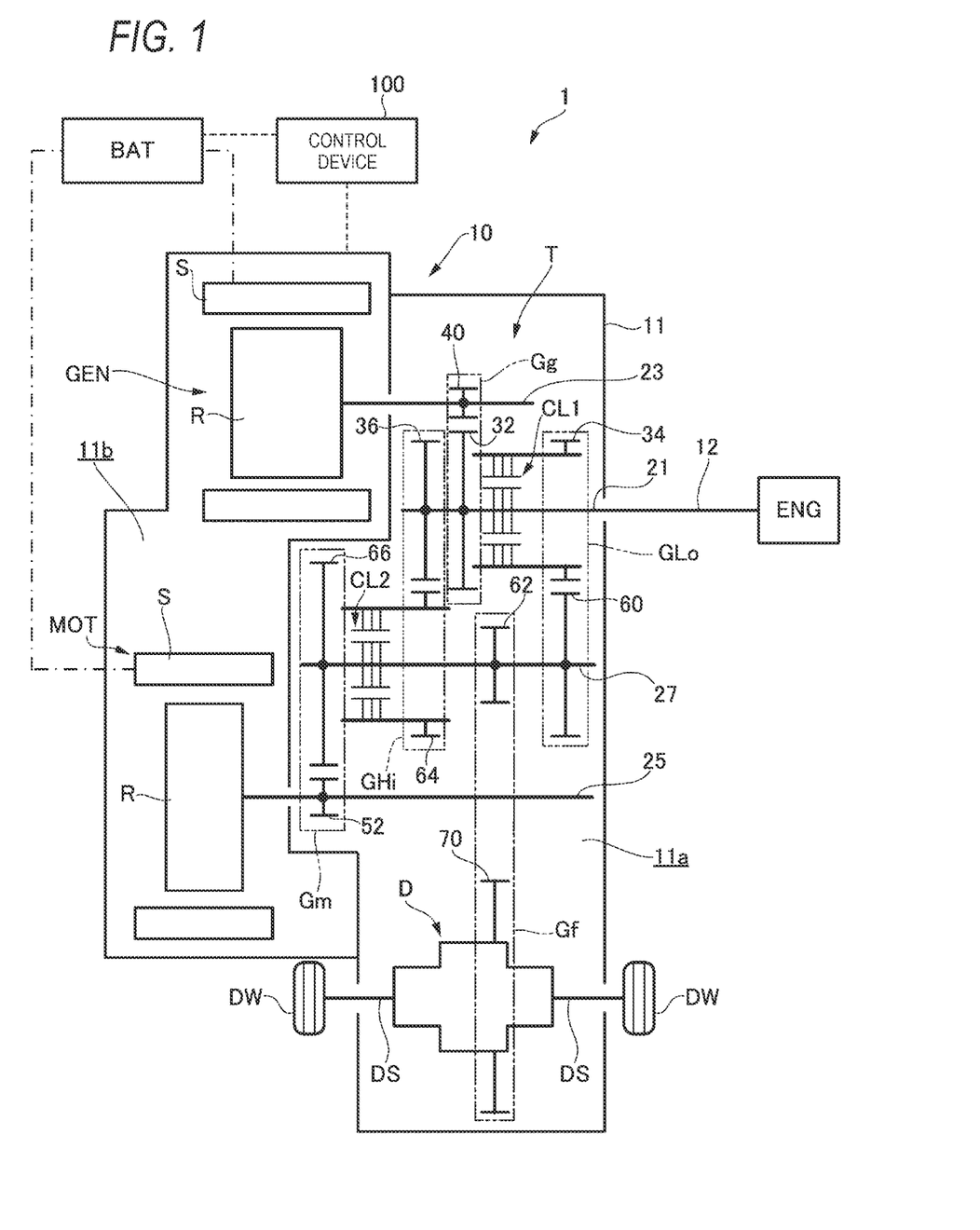
FIG. 1 is a diagram illustrating a schematic configuration of a vehicle including a vehicle control device according to an embodiment of the present invention.

First, a vehicle 1 including a control device 100 according to an embodiment of a vehicle control device of the present invention will be described with reference to FIG. 1. As illustrated in FIG. 1, the vehicle 1 of the present embodiment includes a drive device 10 that outputs a driving force of the vehicle 1, and the control device 100 that performs control of the entire vehicle 1 including the drive device 10.

Drive Device

As illustrated in FIG. 1, the drive device 10 includes an engine ENG that is an example of an internal combustion engine, a generator GEN that is an example of a generator, a motor MOT that is an example of an electric motor, a transmission T, and a case 11 that accommodates the generator GEN, the motor MOT, and the transmission T. The motor MOT and the generator GEN are connected to a battery BAT provided in the vehicle 1, and supply of electric power from the battery BAT and energy regeneration to the battery BAT are possible. The battery BAT is an example of a power storage device.

Transmission

The case 11 is provided with, from an engine ENG side along an axial direction, a transmission accommodation chamber 11a that accommodates the transmission T and a motor accommodation chamber 11b that accommodates the motor MOT and the generator GEN.

The transmission accommodation chamber 11a accommodates an input shaft 21, a generator shaft 23, a motor shaft 25, and a counter shaft 27, which are disposed parallel to one another, and a differential mechanism D.

The input shaft 21 is disposed side by side and coaxially with a crankshaft 12 of the engine ENG. A driving force of the crankshaft 12 is transmitted to the input shaft 21 via a damper (not shown). On the input shaft 21, a generator drive gear 32 constituting a generator gear train Gg is provided.

On the input shaft 21, a low-speed side drive gear 34 constituting a low-speed side engine gear train GLo is provided via a first clutch CL1 on an engine side with respect to the generator drive gear 32, and a high-speed side drive gear 36 constituting a high-speed side engine gear train GHi is provided on a side opposite to the engine side (hereinafter referred to as a motor side). The first clutch CL1 is a hydraulic clutch capable of engaging and disengaging the input shaft 21 with and from the low-speed side drive gear 34, and is a so-called multi-plate friction clutch.

The generator shaft 23 is provided with a generator driven gear 40 that meshes with the generator drive gear 32. The generator drive gear 32 of the input shaft 21 and the generator driven gear 40 of the generator shaft 23 constitute the generator gear train Gg for transmitting rotation of the input shaft 21 to the generator shaft 23. On the motor side of the generator shaft 23, the generator GEN is disposed. The generator GEN is configured to include a rotor R that is fixed to the generator shaft 23, and a stator S that is fixed to the case 11 and disposed on an outer diameter side of the rotor R so as to face the rotor R.

When the rotation of the input shaft 21 is transmitted to the generator shaft 23 via the generator gear train Gg, the rotor R of the generator GEN is rotated by the rotation of the generator shaft 23. Thus, at the time of driving of the engine ENG, power of the engine ENG input from the input shaft 21 can be converted into electric power by the generator GEN.

The motor shaft 25 is provided with a motor drive gear 52 constituting a motor gear train Gm. On the motor shaft 25, the motor MOT is disposed on the motor side with respect to the motor drive gear 52. The motor MOT includes a rotor R that is fixed to the motor shaft 25, and a stator S that is fixed to the case 11 and disposed on an outer diameter side of the rotor R so as to face the rotor R.

The counter shaft 27 is provided with, in an order from the engine side, a low-speed side driven gear 60 that meshes with the low-speed side drive gear 34, an output gear 62 that meshes with a ring gear 70 of the differential mechanism D, a high-speed side driven gear 64 that meshes with the high-speed side drive gear 36 of the input shaft 21 via a second clutch CL2, and a motor driven gear 66 that meshes with the motor drive gear 52 of the motor shaft 25. The second clutch CL2 is a hydraulic clutch capable of engaging and disengaging the counter shaft 27 with and from the high-speed side driven gear 64, and is a so-called multi-plate friction clutch.

The low-speed side drive gear 34 of the input shaft 21 and the low-speed side driven gear 60 of the counter shaft 27 constitute the low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute the high-speed side engine gear train GHi for transmitting the rotation of the input shaft 21 to the counter shaft 27. Here, the low-speed side engine gear train GLo including the low-speed side drive gear 34 and the low-speed side driven gear 60 has a larger reduction ratio than the high-speed side engine gear train GHi including the high-speed side drive gear 36 and the high-speed side driven gear 64.

Accordingly, when the first clutch CL1 is engaged and the second clutch CL2 is disengaged at the time of driving of the engine ENG, a driving force of the engine ENG is transmitted to the counter shaft 27 via the low-speed side engine gear train GLo at a large reduction ratio. On the other hand, when the first clutch CL1 is disengaged and the second clutch CL2 is engaged at the time of driving of the engine ENG, the driving force of the engine ENG is transmitted to the counter shaft 27 via the high-speed side engine gear train GHi at a small reduction ratio. Note that there is no occurrence that the first clutch CL1 and the second clutch CL2 are engaged at the same time.

The motor drive gear 52 of the motor shaft 25 and the motor driven gear 66 of the counter shaft 27 constitute the motor gear train Gm for transmitting rotation of the motor shaft 25 to the counter shaft 27. When the rotor R of the motor MOT is rotated, the rotation of the motor shaft 25 is transmitted to the counter shaft 27 via the motor gear train Gm. Accordingly, at the time of driving of the motor MOT, a driving force of the motor MOT is transmitted to the counter shaft 27 via the motor gear train Gm.

The output gear 62 of the counter shaft 27 and the ring gear 70 of the differential mechanism D constitute a final gear train Gf for transmitting rotation of the counter shaft 27 to the differential mechanism D. Accordingly, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for causing the vehicle 1 to travel is output via a pair of drive wheels DW provided at both ends of the axle DS.

The drive device 10 configured as described above has a power transmission path for transmitting the driving force of the motor MOT to the axle DS (that is, the drive wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the drive device 10 can take a plurality of traveling modes such as an EV traveling mode or a hybrid traveling mode in which the vehicle travels by power output from the motor MOT (that is, the driving force of the motor MOT), and a low-speed side engine traveling mode or a high-speed side engine traveling mode in which the vehicle travels by power output from the engine ENG (that is, the driving force of the engine ENG).

The control device 100 acquires vehicle information related to the vehicle 1 based on detection signals received from various sensors provided in the vehicle 1, and controls the drive device 10 based on the acquired vehicle information. Examples of the sensors provided in the vehicle 1 include a vehicle speed sensor that detects a rotation speed of the axle DS, an accelerator position sensor (hereinafter, also referred to as an AP sensor) that detects an operation amount with respect to an accelerator pedal of the vehicle 1, a brake sensor that detects an operation amount with respect to a brake pedal of the vehicle 1, an engine rotation speed sensor that detects a rotation speed of the engine ENG (hereinafter, also referred to as an engine rotation speed), and a battery sensor that detects a state of the battery BAT (for example, a voltage between terminals, a charging/discharging current, and a temperature of the battery BAT).

The vehicle information includes information indicating a traveling state of the vehicle 1. Examples of the traveling state of the vehicle 1 include a speed of the vehicle 1 (hereinafter, also referred to as a vehicle speed), an AP opening degree indicating an operation amount with respect to the accelerator pedal provided in the vehicle 1 (that is, an accelerator position), a driving force required for traveling of the vehicle 1 (hereinafter, also referred to as a required driving force), and an engine rotation speed.

The vehicle speed can be acquired based on a detection signal from the vehicle speed sensor. The AP opening degree can be acquired based on a detection signal from the AP sensor. The engine rotation speed can be acquired based on a detection signal from the engine rotation speed sensor. The required driving force can be derived based on the vehicle speed, the AP opening degree, or the like.

The vehicle information further includes battery information related to the battery BAT provided in the vehicle 1. The battery information includes information indicating a state of charge (SOC) that is a remaining capacity of the battery BAT. The SOC of the battery BAT is hereinafter also referred to as a battery SOC. The battery SOC can be derived based on a detection signal (for example, a voltage between terminals or a charging/discharging current of the battery BAT) from the battery sensor.

Further, the battery information includes information indicating a temperature of the battery BAT detected by the battery sensor. Hereinafter, the temperature of the battery BAT is also referred to as a battery temperature. In addition, the battery information may include information such as a voltage between terminals and a charging/discharging current of the battery BAT detected by the battery sensor.

The control device 100 controls the drive device 10 based on the vehicle information (that is, the traveling state of the vehicle 1 and the battery information). Specifically, the control device 100 controls the driving force of the vehicle 1 (that is, the output of the drive device 10) by using the required driving force derived based on the vehicle speed and the AP opening degree (that is, the output requirement received from the driver) as a target value. In the following description, an upper-limit value of the driving force of the vehicle 1 is also referred to as a maximum driving force.

The control device 100 controls the drive device 10 based on the vehicle information to cause the vehicle 1 to travel in any one of the plurality of traveling modes (to be described later) that can be taken by the vehicle 1.

In controlling the drive device 10, for example, the control device 100 controls the driving of the engine ENG by controlling supply of fuel to the engine ENG, controls the driving of the motor MOT by controlling supply of electric power from the generator GEN or the battery BAT to the motor MOT, and controls power generation of the generator GEN by controlling a field current or the like flowing through coils of the generator GEN.

Further, in controlling the drive device 10, the control device 100 controls an actuator (not shown), which operates the first clutch CL1, to engage or disengage the first clutch CL1. Similarly, the control device 100 controls an actuator (not shown), which operates the second clutch CL2, to engage or disengage the second clutch CL2.

In this way, the control device 100 controls the engine ENG, the generator GEN, the motor MOT, the first clutch CL1, and the second clutch CL2, thereby enabling the vehicle 1 to travel in any one of the plurality of traveling modes to be described later. Note that the control device 100 is implemented with, for example, an electronic control unit (ECU) that includes a processor, a memory, an interface, and the like.

Traveling Modes that Vehicle can Take

Figure 2:
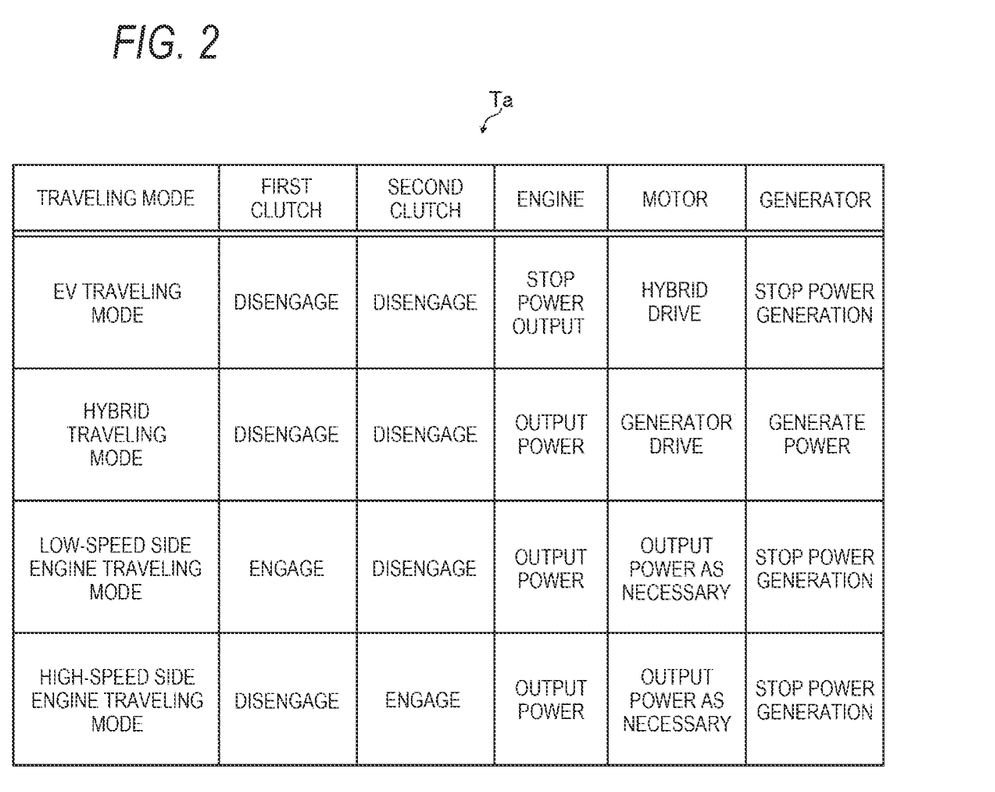
FIG. 2 is a table illustrating contents of traveling modes.

Next, traveling modes that can be taken by the vehicle 1 will be described with reference to a traveling mode table Ta illustrated in FIG. 2. As illustrated in FIG. 2, the vehicle 1 can take an EV traveling mode, a hybrid traveling mode, a low-speed side engine traveling mode, and a high-speed side engine traveling mode.

EV Traveling Mode

The EV traveling mode is a traveling mode in which electric power is supplied from the battery BAT to the motor MOT and the vehicle 1 is caused to travel by power output from the motor MOT based on the electric power.

Specifically, in the case of the EV traveling mode, the control device 100 disengages both the first clutch CL1 and the second clutch CL2. In addition, in the case of the EV traveling mode, the control device 100 stops fuel injection to the engine ENG to stop output of power from the engine ENG. Further, in the case of the EV traveling mode, the control device 100 supplies electric power from the battery BAT to the motor MOT, and causes the motor MOT to output power corresponding to the electric power (illustrated as "battery drive" of motor). Thus, in the EV traveling mode, the vehicle 1 travels by the power output from the motor MOT based on the electric power supplied from the battery BAT.

In the EV traveling mode, as described above, the output of the power from the engine ENG is stopped, and both the first clutch CL1 and the second clutch CL2 are disengaged. Accordingly, in the EV traveling mode, power is not input to the generator GEN, and power generation by the generator GEN is not performed (illustrated as "stop power generation" of generator).

Hybrid Traveling Mode

The hybrid traveling mode is a traveling mode in which electric power is supplied from at least the generator GEN to the motor MOT, and the vehicle 1 is caused to travel by power output from the motor MOT based on the electric power.

Specifically, in the case of the hybrid traveling mode, the control device 100 disengages both the first clutch CL1 and the second clutch CL2. In addition, in the case of the hybrid traveling mode, the control device 100 performs fuel injection to the engine ENG to output power from the engine ENG. The power output from the engine ENG is input to the generator GEN via the generator gear train Gg. Accordingly, power generation by the generator GEN is performed.

Further, in the case of the hybrid traveling mode, the control device 100 supplies electric power generated by the generator GEN to the motor MOT, and causes the motor MOT to output power corresponding to the electric power (illustrated as "generator drive" of motor). The electric power supplied from the generator GEN to the motor MOT is larger than the electric power supplied from the battery BAT to the motor MOT. Therefore, in the hybrid traveling mode, power output from the motor MOT (driving force of the motor MOT) can be made larger than in the EV traveling mode, and a large driving force can be obtained as the driving force (maximum driving force) of the vehicle 1.

In the case of the hybrid traveling mode, the control device 100 can also supply the electric power from the battery BAT to the motor MOT as necessary. That is, the control device 100 can supply electric power to the motor MOT from both the generator GEN and the battery BAT in the hybrid traveling mode. Accordingly, since the electric power supplied to the motor MOT can be increased as compared with that in the case where the electric power is supplied to the motor MOT only by the generator GEN, the power output from the motor MOT can be further increased, and a larger driving force can be obtained as the driving force (maximum driving force) of the vehicle 1.

Low-Speed Side Engine Traveling Mode

The low-speed side engine traveling mode is a traveling mode in which the vehicle 1 is caused to travel by transmitting power output from the engine ENG to the drive wheels DW through the low-speed side power transmission path.

Specifically, in the case of the low-speed side engine traveling mode, the control device 100 performs fuel injection to the engine ENG to output power from the engine ENG. In addition, in the case of the low-speed side engine traveling mode, the control device 100 engages the first clutch CL1 and disengages the second clutch CL2. Accordingly, in the low-speed side engine traveling mode, the power output from the engine ENG is transmitted to the drive wheels DW via the low-speed side engine gear train GLo, the final gear train Gf, and the differential mechanism D to cause the vehicle 1 to travel.

In addition, in the case of the low-speed side engine traveling mode, the power output from the engine ENG is also input to the generator GEN via the generator gear train Gg, but power generation by the generator GEN is controlled so as not to be performed. For example, in the low-speed side engine traveling mode, a switching element provided in an electric-power transmission path between the generator GEN and the battery BAT (for example, a switching element of an inverter device provided between the generator GEN and the battery BAT) is turned off, so that the power generation by the generator GEN is controlled so as not to be performed. Accordingly, in the low-speed side engine traveling mode, it is possible to reduce a loss caused by the generator GEN performing power generation, and to reduce an amount of heat generated by the generator GEN and the like. In addition, in the low-speed side engine traveling mode, when the vehicle 1 is braked, regenerative power generation may be performed by the motor MOT, and the battery BAT may be charged with the generated electric power.

In addition, in the case of the low-speed side engine traveling mode, the control device 100 can supply electric power from the battery BAT to the motor MOT as necessary. Accordingly, in the low-speed side engine traveling mode, the vehicle 1 can be caused to travel also using the power output from the motor MOT based on the electric power supplied from the battery BAT, and a larger driving force can be obtained as the driving force (maximum driving force) of the vehicle 1 as compared with that in a case where the vehicle 1 is caused to travel only by the power of the engine ENG.

High-Speed Side Engine Traveling Mode

The high-speed side engine traveling mode is a traveling mode in which the vehicle 1 is caused to travel by transmitting power output from the engine ENG to the drive wheels DW through the high-speed side power transmission path.

Specifically, in the case of the high-speed side engine traveling mode, the control device 100 performs fuel injection to the engine ENG to output power from the engine ENG. In addition, in the case of the high-speed side engine traveling mode, the control device 100 engages the second clutch CL2 and disengages the first clutch CL1. Accordingly, in the high-speed side engine traveling mode, the power output from the engine ENG is transmitted to the drive wheels DW via the high-speed side engine gear train GHi, the final gear train Gf, and the differential mechanism D to cause the vehicle 1 to travel.

In addition, in the case of the high-speed side engine traveling mode, the power output from the engine ENG is also input to the generator GEN via the generator gear train Gg, but power generation by the generator GEN is controlled so as not to be performed. Accordingly, in the high-speed side engine traveling mode, it is possible to reduce a loss caused by the generator GEN performing power generation, and to reduce an amount of heat generated by the generator GEN and the like. In addition, in the high-speed side engine traveling mode, when the vehicle 1 is braked, regenerative power generation may be performed by the motor MOT, and the battery BAT may be charged with the generated electric power.

In addition, in the high-speed side engine traveling mode, the control device 100 can supply electric power from the battery BAT to the motor MOT as necessary. Accordingly, in the high-speed side engine traveling mode, the vehicle 1 can be caused to travel also using the power output from the motor MOT based on the electric power supplied from the battery BAT, and a larger driving force can be obtained as the driving force (maximum driving force) of the vehicle 1 as compared with that in a case where the vehicle 1 is caused to travel only by the power of the engine ENG.

Note that, when the vehicle 1 is traveling in the low-speed side engine traveling mode or the high-speed side engine traveling mode in which the drive wheels are driven by the engine ENG, supplying the electric power of the battery BAT to the motor MOT and assisting the driving of the drive wheels DW (that is, traveling of the vehicle 1) by the motor MOT is also referred to as motor assist hereinafter.

A driving force of the motor MOT for driving the drive wheels DW during motor assist is hereinafter also referred to as an assist amount. An upper-limit value of the assist amount is hereinafter also referred to as an upper-limit assist amount. The electric power supplied from the battery BAT to the motor MOT to perform the motor assist is hereinafter also referred to as assist electric power. An upper-limit value of the assist electric power is hereinafter also referred to as upper-limit assist electric power. The upper-limit assist amount depends on the upper-limit assist electric power.

Restriction on Upper-Limit Assist Electric Power
(i.e., Upper-Limit Assist Amount)

The battery BAT generates heat at the time of supplying electric power to the motor MOT. For this reason, the vehicle 1 is provided with a battery cooling device (not shown) that cools the battery BAT. However, depending on the magnitude of electric power (for example, assist electric power) supplied from the battery BAT to the motor MOT, an amount of heat generated by the battery BAT may exceed a cooling capacity of the battery cooling device, and in such a case, the battery temperature rises. In order to suppress degradation of the battery BAT, it is desirable to use the battery BAT in an appropriate temperature range by avoiding the battery BAT from being in a high temperature state.

As a method of avoiding the battery BAT from being in a high temperature state, it is conceivable to stop supply of electric power from the battery BAT to the motor MOT at a time-point when the battery temperature reaches a predetermined temperature during supply of electric power from the battery BAT to the motor MOT. In this way, it is possible to avoid the battery temperature from rising above the predetermined temperature. However, when the battery temperature reaches the predetermined temperature during the motor assist, if the assist electric power (that is, the assist amount) is set to 0 at that time-point, the driving force of the vehicle 1 suddenly drops, which may give the driver a feeling of strangeness and reduce drivability.

Therefore, when the battery temperature reaches a first temperature, the control device 100 restricts the upper-limit assist electric power (that is, the upper-limit assist amount) such that a reduction amount of the maximum driving force of the vehicle 1 falls within an allowable range. Here, the first temperature is determined in advance by a manufacturer or the like of the control device 100 as a temperature that serves as a condition for starting suppression of a temperature rise of the battery BAT. For example, the first temperature may be 38[° C.].

Here, the allowable range is determined in advance by the manufacturer or the like of the control device 100 in consideration of the influence on drivability due to a decrease in the maximum driving force of the vehicle 1. For example, the allowable range is a range in which the maximum driving force of the vehicle 1 before the battery temperature reaching the first temperature (that is, in a normal state) is allowed to decrease by 20%.

Specifically, when the battery temperature reaches the first temperature, the control device 100 reduces the upper-limit assist electric power to electric power that is larger than 0 (zero) and smaller than the upper-limit assist electric power before the battery temperature reaching the first temperature. Thus, even if the battery temperature reaches the first temperature during the motor assist, the motor assist can be continued while suppressing a subsequent rise in the battery temperature. Therefore, it is possible to avoid a sudden termination of the motor assist and a sudden drop of the driving force of the vehicle 1 at the time when the battery temperature reaches the first temperature during the motor assist.

In this way, when the battery temperature reaches the first temperature, the control device 100 restricts the upper-limit assist electric power in consideration of a reduction amount of the maximum driving force of the vehicle 1, so that it is possible to suppress a rise in the battery temperature while avoiding a sudden drop in the driving force of the vehicle 1. Therefore, the control device 100 can suppress degradation of the battery BAT while avoiding a decrease in drivability.

Specific Example of Restricting Upper-Limit Assist Electric Power (i.e., Upper-Limit Assist Amount)

Figure 3:
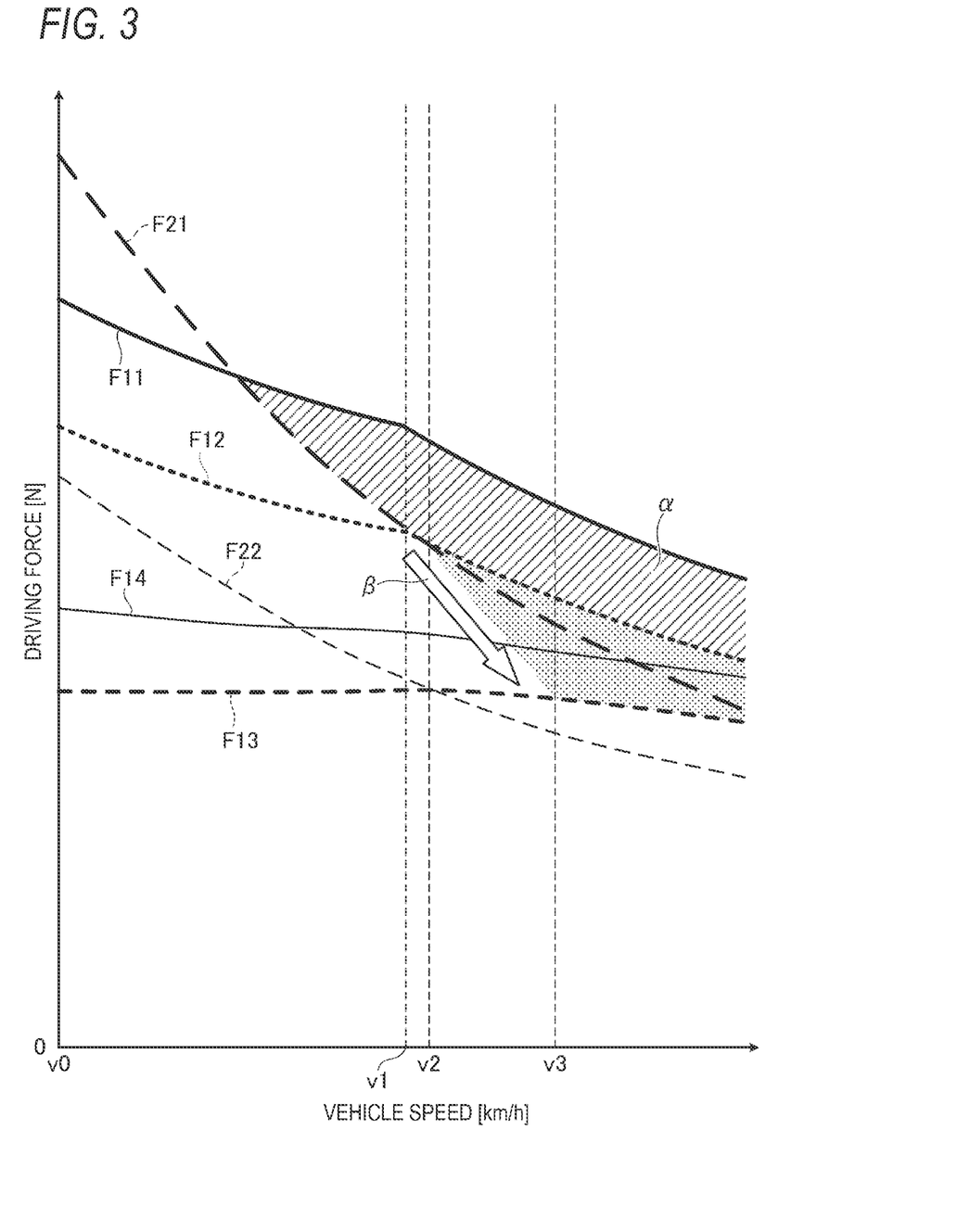
FIG. 3 is a graph illustrating an example of control of upper-limit assist electric power.

Next, a specific example of restricting the upper-limit assist electric power (that is, the upper-limit assist amount) will be described with reference to FIG. 3. In FIG. 3, a horizontal axis represents a vehicle speed [km/h], and a vertical axis represents a driving force [N] of the vehicle 1. FIG. 3 illustrates a driving force of the vehicle 1 in a case where the vehicle speed is equal to or higher than a predetermined v0. Here, v0 is a speed at which the control device 100 can cause the vehicle 1 to travel in the high-speed side engine traveling mode, and may be, for example, 100 [km/h].

In FIG. 3, a driving force F11 indicates a maximum driving force of the vehicle 1 in the high-speed side engine traveling mode in a normal state (that is, at the time when restriction on the upper-limit assist electric power in accordance with the battery temperature is not performed by the control device 100). A driving force F12 indicates a driving force obtained by reducing the driving force F11 to a lower limit allowed by the allowable range (for example, a 20% decrease of the driving force F11).

In FIG. 3, a driving force F13 indicates a maximum driving force of the vehicle 1 in the high-speed side engine traveling mode in a case where the motor assist is not performed (that is, in a case where the vehicle 1 travels only by the driving force of the engine ENG). A driving force F14 indicates a maximum driving force of the vehicle 1 in the high-speed side engine traveling mode in a case where the motor assist is performed at predetermined assist electric power (that is, the assist amount) at which the battery BAT is balanced in heat.

Here, the expression "the battery BAT is balanced in heat" means that the amount of heat generated by the battery BAT is equal to the cooling capacity of the battery cooling device. That is, the control device 100 can lower the battery temperature by making electric power supplied from the battery BAT to the motor MOT in the high-speed side engine traveling mode smaller than the predetermined assist electric power at which the battery BAT is balanced in heat, in other words, by making the maximum driving force of the vehicle 1 in the high-speed side engine traveling mode smaller than the driving force F14.

In addition, in FIG. 3, a driving force F21 indicates a maximum driving force of the vehicle 1 in the hybrid traveling mode in a case where electric power is supplied to the motor MOT from both the generator GEN and the battery BAT. A driving force F22 indicates a maximum driving force of the vehicle 1 in the hybrid traveling mode in a case where electric power is supplied to the motor MOT only from the generator GEN.

When the battery temperature is equal to or higher than the first temperature and lower than a second temperature, the control device 100 reduces the upper-limit assist electric power (that is, the upper-limit assist amount) such that the maximum driving force of the vehicle 1 in the high-speed side engine traveling mode becomes the driving force F12. A reduction amount of the upper-limit assist electric power at this time is set in advance in the control device 100 by the manufacturer or the like of the control device 100. In addition, the second temperature is also determined in advance by the manufacturer or the like of the control device 100. For example, the second temperature may be 40[° C.].

Even when the maximum driving force of the vehicle 1 in the high-speed side engine traveling mode is set to the driving force F12, in a period in which the driving force F21 is larger than the driving force F12 (that is, in a period in which the vehicle speed<v1 in FIG. 3), it is possible to suppress a decrease in the maximum driving force of the vehicle 1 by causing the vehicle 1 to travel in the hybrid traveling mode. Specifically, in this way, an actual reduction amount of the maximum driving force of the vehicle 1 can be indicated by a reference sign α in FIG. 3.

In addition, the control device 100 may change the upper-limit assist electric power (that is, the upper-limit assist amount) in accordance with the vehicle speed. In this way, the control device 100 can gradually change the upper-limit assist electric power (that is, the upper-limit assist amount) in accordance with the vehicle speed, and can suppress a rapid change in the driving force of the vehicle 1 that may lead to a decrease in drivability.

Specifically, after the vehicle speed reaches a predetermined value v2 in a state where the battery temperature has reached the second temperature, the control device 100 reduces the upper-limit assist electric power according to an increase in the vehicle speed, and when the vehicle speed reaches a predetermined value v3 (v3>v2) in a state where the battery temperature has reached the second temperature, the control device 100 sets the upper-limit assist electric power to 0.

Here, v2 is a speed determined in advance by the manufacturer or the like of the control device 100, and may be, for example, 150 [km/h]. In addition, v2 is an example of a first speed. Here, v3 is a speed determined in advance by the manufacturer or the like of the control device 100, and may be, for example, 170 [km/h]. In addition, v3 is an example of a second speed.

Accordingly, as indicated by a void arrow denoted by a reference sign β in FIG. 3, after the vehicle speed reaches v2 in a state where the battery temperature reaches the second temperature, the control device 100 can gradually decrease the driving force of the vehicle 1 in accordance with an increase in the vehicle speed so as to approach the driving force F13. Accordingly, the control device 100 can suppress a rapid change in the driving force of the vehicle 1 that may lead to a decrease in drivability.

When the battery temperature reaches a predetermined third temperature (for example, 45[° C.]) higher than the second temperature before the vehicle speed reaches v3, the control device 100 may set the upper-limit assist electric power to 0 at that time. In this way, the battery temperature can be prevented from rising above the third temperature.

Restriction on Upper-Limit Regenerative Electric Power

The battery BAT can be charged by regenerative power generation of the motor MOT in response to braking of the vehicle 1, and also generates heat during the charging. Then, when electric power supplied from the motor MOT to the battery BAT that is generated by regenerative power generation (hereinafter referred to as regenerative electric power) is large, the amount of heat generated by the battery BAT exceeds the cooling capacity of the battery cooling device, and the battery temperature rises. When the battery BAT is in a high temperature state, as described above, the control device 100 restricts the upper-limit assist electric power (that is, the upper-limit assist amount), and thus the driving force of the vehicle 1 may be reduced.

Therefore, in order to appropriately charge the battery BAT by the regenerative electric power of the motor MOT while avoiding the battery BAT from being in a high temperature state, the control device 100 may change upper-limit regenerative electric power, which is an upper-limit value of electric power that can be generated by regenerative power generation of the motor MOT, according to the vehicle speed. Hereinafter, an example of control of the upper-limit regenerative electric power by the control device 100 will be described with reference to FIG. 4.

Figure 4:
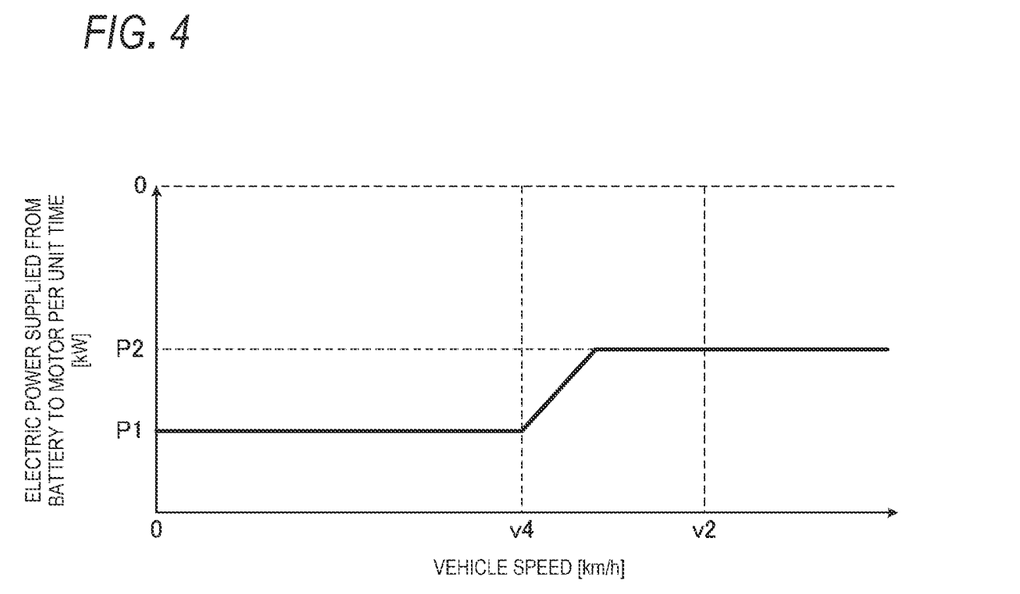
FIG. 4 is a graph illustrating an example of control of upper-limit regenerative electric power.

In FIG. 4, a horizontal axis represents a vehicle speed [km/h], and a vertical axis represents electric power [kW] that can be supplied from the battery BAT to the motor MOT per unit time. In FIG. 4, a case where the electric power that can be supplied from the battery BAT to the motor MOT per unit time is smaller than 0 kW indicates electric power that can be supplied from the motor MOT to the battery BAT per unit time, that is, the upper-limit regenerative electric power.

As illustrated in FIG. 4, the control device 100 sets the upper-limit regenerative electric power to P1 until the vehicle speed reaches a predetermined V4 (where V4<V2). Here, v4 is a speed determined in advance by the manufacturer or the like of the control device 100, and may be, for example, 100 [km/h]. In addition, v4 is an example of a third speed. Here, P1 is, for example, rated input electric power of the battery BAT.

Then, when the vehicle speed is equal to or higher than V4, the control device 100 gradually decreases the upper-limit regenerative electric power to a predetermined P2 (where P2<P1) in accordance with an increase in the vehicle speed. Here, P2 is, for example, upper-limit regenerative electric power of regenerative electric power of the motor MOT at which the amount of heat generated by the battery BAT is equal to or less than the cooling capacity of the battery cooling device.

In this way, the control device 100 sets the upper-limit regenerative electric power to P2 (that is, reduces the upper-limit regenerative electric power to be lower than P1) in a case where the vehicle speed is equal to or higher than V4, which is lower than V2, as compared with a case where the vehicle speed is lower than V4, so that it is possible to suppress arise in the battery temperature. Therefore, the control device 100 can charge the battery BAT with the regenerative electric power while suppressing a decrease in the driving force of the vehicle 1 due to restriction on the upper-limit assist electric power (that is, the upper-limit assist amount). Further, the control device 100 sets the upper-limit regenerative electric power to P1 until the vehicle speed becomes V4, so that the regenerative electric power can be recovered as much as possible, and the battery BAT can be charged accordingly.

As described above, according to the control device 100, it is possible to suppress degradation of the battery BAT while avoiding a decrease in drivability.

The present invention is not limited to the embodiment described above, and modifications, improvements, or the like can be made as appropriate.

For example, in the above-described embodiment, two traveling modes of the high-speed side engine traveling mode and the low-speed side engine traveling mode are provided as the traveling modes in which the power of the engine ENG is transmitted to the drive wheels DW to cause the vehicle 1 to travel, but the present invention is not limited thereto. For example, only the high-speed side power transmission path may be provided so that only the high-speed side engine traveling mode can be taken as the traveling mode in which the power of the engine ENG is transmitted to the drive wheels DW to cause the vehicle 1 to travel.

In the above-described embodiment, an example is described in which the upper-limit assist electric power (that is, the upper-limit assist amount) of the motor assist in the high-speed side engine traveling mode is restricted, but the present invention is not limited thereto. For example, even in the low-speed side engine traveling mode, the upper-limit assist electric power (that is, the upper-limit assist amount) may be restricted in the same manner as in the high-speed side engine traveling mode of the above-described embodiment. In addition, a restriction amount of the upper-limit assist electric power (that is, the upper-limit assist amount) may vary between the high-speed side engine traveling mode and the low-speed side engine traveling mode.

In the present specification, at least the following matters are described. Although corresponding components and the like in the above-described embodiment are shown in parentheses, the present invention is not limited thereto.

(1) A vehicle control device (control device 100) that controls a vehicle (vehicle 1), the vehicle including an internal combustion engine (engine ENG), a power storage device (battery BAT), an electric motor (motor MOT) that performs driving based on supply of electric power from at least the power storage device, and a drive wheel (drive wheels DW) that is driven by at least one of the internal combustion engine and the electric motor, in which the vehicle control device is configured to:
execute motor assist when the vehicle is traveling by the drive wheel being driven by the internal combustion engine, in which electric power of the power storage device is supplied to the electric motor and the electric motor assists driving of the drive wheel;
change upper-limit assist electric power, which is an upper-limit value of electric power supplied from the power storage device to the electric motor in order to perform the motor assist, in accordance with a temperature of the power storage device; and
when the temperature of the power storage device reaches a first temperature, restrict the upper-limit assist electric power such that a reduction amount of a maximum driving force of the vehicle falls within an allowable range.

According to (1), when the temperature of the power storage device reaches the first temperature, the upper-limit assist electric power is restricted such that the reduction amount of the maximum driving force of the vehicle falls within the allowable range, and thus it is possible to suppress a rise in the temperature of the power storage device while avoiding a sudden drop in the driving force of the vehicle. Therefore, it is possible to suppress degradation of the power storage device while avoiding a decrease in drivability caused by a sudden drop in the driving force of the vehicle.

(2) The vehicle control device according to (1),
in which when the temperature of the power storage device reaches the first temperature, the upper-limit assist electric power is reduced to electric power that is larger than 0 and smaller than the upper-limit assist electric power before the temperature of the power storage device reaching the first temperature.

According to (2), even if the temperature of the power storage device reaches the first temperature during the motor assist, the motor assist can be continued while suppressing a subsequent rise in the temperature of the power storage device.

(3) The vehicle control device according to (1) or (2),
in which the upper-limit assist electric power is changeable in accordance with a speed of the vehicle.

According to (3), it is possible to gradually change the upper-limit assist electric power in accordance with the speed of the vehicle, and it is possible to suppress a rapid change in the driving force of the vehicle that may lead to a decrease in drivability.

(4) The vehicle control device according to (3),
in which when the speed of the vehicle reaches a first speed in a state where the temperature of the power storage device has reached a second temperature higher than the first temperature, the upper-limit assist electric power is reduced according to an increase in the speed of the vehicle, and
in which when the speed of the vehicle reaches a second speed higher than the first speed in a state where the temperature of the power storage device has reached the second temperature, the upper-limit assist electric power is set to 0.

According to (4), it is possible to gradually change the upper-limit assist electric power in accordance with the speed of the vehicle, and it is possible to suppress a rapid change in the driving force of the vehicle that may lead to a decrease in drivability.

(5) The vehicle control device according to (4),
in which the electric motor performs regenerative power generation in response to braking of the vehicle, and
in which the vehicle control device is configured to:
change upper-limit regenerative electric power, which is an upper-limit value of electric power that the electric motor is capable of generating by regenerative power generation, in accordance with the speed of the vehicle; and
reduce the upper-limit regenerative electric power in a case where the speed of the vehicle is equal to or higher than a third speed, which is lower than the first speed, as compared with a case where the speed of the vehicle is lower than the third speed.

According to (5), it is possible to charge the power storage device with the regenerative electric power of the electric motor while suppressing a decrease in the driving force of the vehicle due to restriction on the upper-limit assist electric power.

The invention claimed is:
1. A vehicle control device that controls a vehicle, the vehicle comprising an internal combustion engine, a power storage device, an electric motor that performs driving based on supply of electric power from at least the power storage device, and a drive wheel that is driven by at least one of the internal combustion engine and the electric motor, the vehicle control device comprising:
circuitry configured to:
execute motor assist when the vehicle is traveling by the drive wheel being driven by the internal combustion engine, in which electric power of the power storage device is supplied to the electric motor and the electric motor assists driving of the drive wheel;
change upper-limit assist electric power, which is an upper-limit value of electric power supplied from the power storage device to the electric motor in order to perform the motor assist, in accordance with a temperature of the power storage device; and
when the temperature of the power storage device reaches a first temperature, restrict the upper-limit assist electric power such that a reduction amount of a maximum driving force of the vehicle falls within an allowable range,
wherein the upper-limit assist electric power is changeable in accordance with a speed of the vehicle,
wherein when the speed of the vehicle reaches a first speed in a state where the temperature of the power storage device has reached a second temperature higher than the first temperature, the upper-limit assist electric power is reduced according to an increase in the speed of the vehicle, and
wherein when the speed of the vehicle reaches a second speed higher than the first speed in a state where the temperature of the power storage device has reached the second temperature, the upper-limit assist electric power is set to 0.
2. The vehicle control device according to claim 1,
wherein when the temperature of the power storage device reaches the first temperature, the upper-limit assist electric power is reduced to electric power that is larger than 0 and smaller than the upper-limit assist electric power before the temperature of the power storage device reaching the first temperature.

3. The vehicle control device according to claim 1,
wherein the electric motor performs regenerative power generation in response to braking of the vehicle, and
wherein the circuitry is further configured to:
- change upper-limit regenerative electric power, which is an upper-limit value of electric power that the electric motor is capable of generating by regenerative power generation, in accordance with the speed of the vehicle; and
- reduce the upper-limit regenerative electric power in a case where the speed of the vehicle is equal to or higher than a third speed, which is lower than the first speed, as compared with a case where the speed of the vehicle is lower than the third speed.

* * * * *